(12) United States Patent
Kohli et al.

(10) Patent No.: US 9,122,384 B1
(45) Date of Patent: Sep. 1, 2015

(54) SYSTEM AND METHOD FOR MAINTAINING DYNAMIC VISUAL CUE FOR ASSOCIATED CIRCUITRY OF SCHEMATIC OBJECT

(71) Applicant: CADENCE DESIGN SYSTEMS, INC., San Jose, CA (US)

(72) Inventors: Vikas Kohli, Noida (IN); Amit Kumar Sharma, Greater Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 216 days.

(21) Appl. No.: 13/949,578

(22) Filed: Jul. 24, 2013

(51) Int. Cl.
    G09G 5/02 (2006.01)
    G09G 5/36 (2006.01)
    G06T 11/00 (2006.01)
    G06T 19/00 (2011.01)
    G06F 3/0481 (2013.01)
    G06F 3/14 (2006.01)
    G06F 3/0484 (2013.01)

(52) U.S. Cl.
    CPC .............. G06F 3/04842 (2013.01); G09G 5/02 (2013.01); G06F 3/0481 (2013.01); G06T 11/001 (2013.01)

(58) Field of Classification Search
    CPC combination set(s) only.
    See application file for complete search history.

(56) References Cited

U.S. PATENT DOCUMENTS

| 7,418,683 | B1 * | 8/2008 | Sonnard et al. | 716/122 |
| 7,735,036 | B2 * | 6/2010 | Dennison et al. | 716/106 |
| 7,761,829 | B1 * | 7/2010 | Jayachandran et al. | 716/130 |
| 8,060,852 | B1 * | 11/2011 | Varma et al. | 716/136 |
| 8,271,909 | B2 * | 9/2012 | Majumder et al. | 716/53 |
| 8,640,079 | B2 * | 1/2014 | Majumder et al. | 716/139 |
| 8,726,233 | B1 * | 5/2014 | Raghavan | 717/113 |
| 8,732,651 | B1 * | 5/2014 | Kukal et al. | 716/139 |
| 2010/0153888 | A1 * | 6/2010 | Jarosz | 715/856 |
| 2010/0205575 | A1 * | 8/2010 | Arora et al. | 716/11 |

* cited by examiner

Primary Examiner — Wesner Sajous
(74) Attorney, Agent, or Firm — Rosenberg, Klein & Lee (57) ABSTRACT

A method and system are provided for maintaining dynamic visual cues/graphic indicia for associated circuitry of a schematic object. The dynamic visual cues or graphic indicia indicate a number of states of the parent circuit object and its associated circuitry. The visibility, placement status, and other attributes of the parent or associated circuitry may be quickly discerned by inspection of the visual indicia. Navigation, including manipulations of one or both of the parent and associated circuitry are available through actuation of the visual cue or a selectable button proximately disposed thereto.

20 Claims, 6 Drawing Sheets

SYSTEM AND METHOD FOR MAINTAINING DYNAMIC VISUAL CUE FOR ASSOCIATED CIRCUITRY OF SCHEMATIC OBJECT

BACKGROUND OF THE INVENTION

The subject system and method are generally directed to establishing and maintaining a dynamic visual cue for associated circuitry connectable to a schematically represented object of an electronic circuit design. Associated circuitry facilitates operational implementation of the object in the electronic circuit design without directly altering the digital logic to be carried out thereby. The system and method provide measures for generating and adaptively managing visual cues relating to such associated circuitry for one or more circuit objects of the given design schematically represented for viewing by a user.

While design tools in general and particularly electronic design automation (EDA) tools for creating, modifying, and reviewing integrated circuits (IC), printed circuit boards (PCB), and package designs to arrive at an IC product are known, such heretofore known systems and methods are encumbered by numerous deficiencies, not the least of which is a lack of effective usability. Graphical saturation, overcluttering, congestion, and the inability to effectively navigate amongst a design all detract from the usability of such heretofore known systems.

The lack of such capabilities have heretofore hindered electronic design flows, time-to-market, and costs. There is therefore a need for a system and method for maintaining dynamic visual cues for associated circuitry of schematic objects.

SUMMARY OF THE INVENTION

It is an object of the present invention to provide a system and method for maintaining dynamic visual cues for associated circuitry of schematic objects.

It is an object of the present invention to provide a system and method for schematic navigation between associated circuitry and corresponding parent circuit object.

It is an object of the present invention to provide a system and method for manipulation of associated circuitry from a parent circuit object.

These and other objects are attained in a method and system for maintaining dynamic visual cues for associated circuitry of schematic objects.

A system for adaptively maintaining a visual cue for associated circuitry relating to a schematically represented circuit object of an electronic circuit design includes a circuit editing tool which accesses a graphic data base to electronically render schematic representations of the circuit objects responsive to user input. The circuit editing tool has a graphic user interface and a display for graphically displaying the schematic representations on one or more graphic pages. A capture unit is coupled to the circuit editing tool. The capture unit is selectively actuated to acquire associated circuitry corresponding to at least one circuit object. A visual cue management unit is coupled to the capture unit and the circuit editing tool. The visual cue management unit is programmably configured to automatically monitor a plurality of predetermined attributes for each associated circuitry captured of the selected circuit object. Additionally, the visual cue management unit automatically and adaptively generates predetermined graphic indicia for each of the predetermined attributes for a concurrent display with the schematic representations of the selected circuit object. A visual cue navigation unit is coupled to the visual cue management unit and the circuit editing tool. The visual cue navigation unit maintains a user-selectable actuation button on the graphic user interface for at least one of the predetermined graphic indicia displayed.

A system for maintaining a dynamic visual cue for associated circuitry connectable to a schematically represented circuit object of an electronic circuit design includes a circuit editing tool which accesses a graphic database to electronically render schematic representations of the circuit objects responsive to user input. The circuit editing tool has a graphic user interface and a display for graphically displaying the schematic representations on one or more graphic pages. A capture unit is coupled to the circuit editing tool. The capture unit is selectively actuated to acquire associated circuitry corresponding to at least one circuit object. The associated circuitry enables operational implementation of the circuit object in the electronic circuit design without substantial alteration thereof in the digital logic. A visual cue management unit is coupled to the capture unit and the circuit editing tool. The visual cue management unit is programmably configured to automatically monitor a plurality of predetermined attributes for each associated circuitry captured of the selected circuit object. The visual cue management unit automatically and adaptively generates predetermined graphic indicia for each predetermined attribute for concurrent display with the schematic representation of the selected circuit object and visually disposes at least one of the predetermined graphic indicia at least partially upon the schematic representation of the selected circuit object displayed by the circuit editing tool. A visual cue navigation unit is coupled to the visual cue management unit and the circuit editing tool. The visual cue navigation unit maintains a user-selectable actuation button on the graphic user interface for at least one of the predetermined graphic indicia displayed.

A method for adaptively maintaining a visual cue for associated circuitry relating to a schematically represented circuit object of an electronic circuit design includes establishing a processor coupled to a memory storing a graphic database. The processor is executed to access the graphic database and render schematic representations of the circuit objects responsive to user input. The circuit editing tool has a graphic user interface and a display. The display is actuated to graphically display the schematic representations on one or more graphic pages. The associated circuitry corresponding to at least one circuit object is selectively identified. A plurality of predetermined attributes for each associated circuitry captured corresponding to the selected circuit object is monitored. Predetermined graphic indicia are adaptively generated for each of the predetermined attributes for concurrent display with the schematic representation of the selected circuit object. A user-selectable actuation control is maintained on the graphic user interface for at least one of the predetermined graphic indicia displayed.

Additional aspects and details will be set forth in the description which follows and, in part, will be apparent from the description and Figures.

DESCRIPTION OF THE PREFERRED EMBODIMENTS

The subject system and method generally provide measures for maintaining dynamic visual cues for associated circuitry of a schematic object during electronic design, such as in an electronic design automation (EDA) user interface. Additionally, the subject system and method provide for, among other things, selective reviewing of parent objects and/or associated circuitry; schematic navigation between parent objects and associated circuitry; and manipulation of associated circuitry from parent circuit objects/connections.

Along a typical electronic design flow, a circuit is conceived and elaborated by teams of design engineers through many computer-aided stages to arrive at a logical schematic circuit design. The schematic circuit design graphically displays all of the circuit objects of the circuit design and the interconnections between circuit objects. Such designs may become quite large, often incorporating tens to hundreds of millions of circuit objects. The PCB and package alone may contain tens of thousands of components and consequently, many more pins, certain of which may be served by associated circuitry disposed throughout various pages of the schematic.

An illustrative electronic design flow traverses recursively through a plurality of stages including the logical schematic editing stage towards the actual fabrication of complex integrated circuit devices, microchips, and systems. Device designs are extensively planned out, edited, manipulated, reviewed, implemented, verified, and remedially modified/transformed iteratively as needed to ultimately arrive at a fabricated tangible physical device.

In these types of design flows and others, an engineer or design team may have an idea or conception of a new circuit design having certain qualitative functionality. This idea is then mapped out into a logical schematic defining a qualitative view of the functional goals of the device and interconnections amongst functional components thereof. Merely for example (though not shown), a circuit schematic defines a first functional block as connected to a second functional block which may be, for example, coupled to a character generator which may be coupled to a device display. At another level, a first output of an AND gate may be coupled to an OR gate, and at yet a more detailed logical abstraction, two transistors may be, for example, serially coupled to represent an AND gate. A large number of different abstractions of different circuit objects at different levels may be available to qualitatively capture the idea or conception of an ultimate device or goal. Such interconnective relationships and circuit objects are graphically represented at varying levels of abstraction in a circuit schematic.

The circuit schematic is then created, reviewed, and remedially modified according to design rules, constraints, and goals of the design engineers in a schematic editor tool of any suitable type known in the art. The schematic editor tool typically provides a number of functions and features for manipulation of the circuit schematic representing the circuit design. With the size and complexity of modern circuit designs, however, mistakes and omissions are common and may substantially frustrate the completion of the circuit design. The circuit schematic must generally be completed before subsequent stages of development may be started, such as physical layout and Mask pattern generation. Providing designers with visual indicia that display the status of the circuit object or associated circuitry disposed proximate to those circuit objects empowers design engineers to quickly and conveniently ascertain the status of a design, circuit objects, and associated circuitry. The provision of navigation and manipulation actions between parent circuit objects and associated circuitry enables design engineers to efficiently and accurately review and complete the circuit design. Moreover, the design engineers are able to ensure that the edits were successful—adjudged by corresponding dynamic visual cues presented with a given parent object rather than by tediously navigating page-by-page to get at associated circuitry to confirm before returning to the parent circuit object.

Graphical saturation, over-cluttering, congestion, and the inability to effectively navigate between a parent circuit object and associated circuitry thereof (perhaps scattered across numerous different pages of the circuit design) all detract from the usability of such heretofore known systems. For a given circuit IC design, a large number of components are generally interconnected to form the circuit design. Components related to the logical operation of the circuit design such as AND, OR, NOR gates and the like are supported by associated circuitry. Associated circuitry includes any part of the circuit design not meant to contribute to the circuit design's digital logic, but facilitates circuit operation, typically by addressing analog factors. Examples include associated circuitry for: regulating voltage, filtering noise, and the like.

A circuit design may include excessive numbers of logical components and associated circuitry. For example, PCB and package designs may have components numbered in the tens of thousands and many more interconnections—each potentially having corresponding associated circuitry. Such components may be spread across numerous pages of a circuit schematic having graphical representations of each component along with interconnective conductive segments therebetween.

Teams of engineers and designers working in parallel in various design engineering flows are required to review, modify, and implement circuit components to arrive at a fully functional circuit design. Such circuit designs, at the schematic stage, may not be to scale or linearly disposed where adjacent parts necessarily appear adjacently in a circuit editor. In a schematic representation, for instance, components which are directly connected may nonetheless be separated by any number of pages. For example, a first component may be arranged on a first schematic page, whereas an associated or interconnected component may be arranged be on an entirely different page, perhaps with quite a few pages therebetween. Generally, to save memory, only a subset of the total pages of the circuit schematic are loaded into memory and are dynamically loaded responsive to navigation. Conventionally, a designer may be reviewing one component and have no indication that there is associated circuitry connected to that component unless they happen to inspect an entirely different page of the design with the associated circuitry.

For teams of circuit designers to make effective use of their time, being able to selectively focus on relevant portions of the design to the exclusion of other non-relevant portions would be beneficial. Additionally, being able to quickly navigate, irrespective of intervening pages, between associated portions of a design would also be beneficial. Being able to quickly ascertain properties of a circuit design and discern important parameters, attributes, features, or the state of the design would be particularly beneficial. However, known systems and methods of electronic design automation do not suitably provide such features. Instead, users are presented with a flat representation of an oftentimes massive design which serves to confuse design engineers and constrain their ability to effectively and quickly review, navigate, modify, and manipulate associated portions of the circuit design.

The lack of effective, efficient, and easy-to-use interfaces in the EDA flow inhibits designers and engineers from creating and effectively working with circuit designs in timely and error-free manner. A given design house may have numerous design engineers concurrently working on the same circuit design. Groups of designers solely devoted to schematic capture of the circuit design are not uncommon. In the aggregate, even minor gains in efficiency and accuracy for each designer may be substantial.

Some users may be working on a first portion of the design while others work on a second, wholly unrelated portion. One team of engineers, for example, may be evaluating a portion of the logic elements, while another team of engineers seek to modify associated circuitry for such logic components. The associated circuitry then may be wholly irrelevant to the first team though it is of central concern to the second. Empowering design engineers to specialize and focus in certain areas and facilitate their ready access to an uncluttered display of only the relevant portions of the design which they are operating upon has the potential to save considerable time and expense, while reducing error.

Figure 1A:
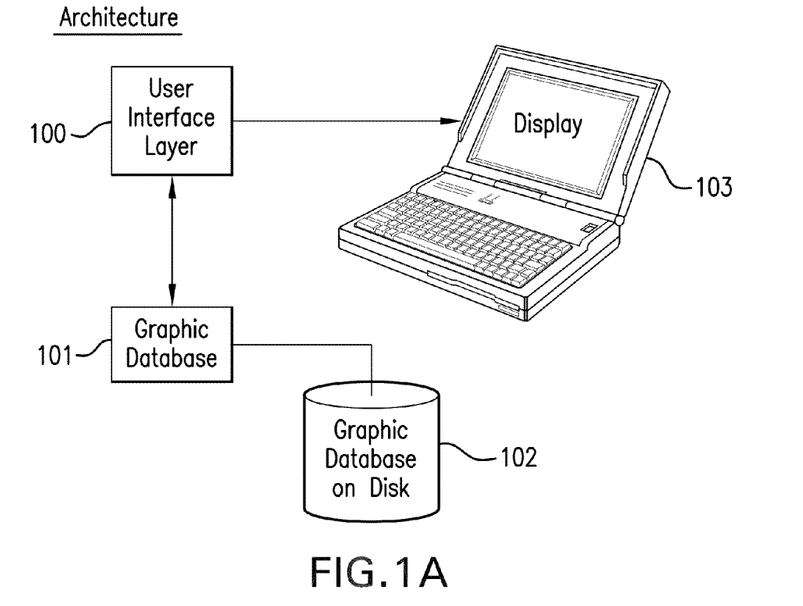
FIG. 1A is a schematic diagram illustrating an interconnection of units in a system formed in accordance with an exemplary embodiment of the present invention.

FIG. 1A illustrates an interconnection of units in a system formed to implement certain features disclosed herein according to various exemplary embodiments of the present invention. As shown, a graphic database on disk 102 includes a graphic database 101 of a number of circuit components including circuit objects of digital logic and associated circuitry. Parent circuit objects include any object implementing the core functional logic portion of a circuit design. Some exemplary parent circuit objects of digital logic include AND, OR, NOR, XOR gates, as well as transistors, flip-flops, and the pins and nets thereof.

Associated circuitry provides for support of the digital logic parent circuit objects, such as by regulating a voltage, filtering a signal, or providing other such analog conditioning or suitable preparation of a signal to properly effect the digital logic as designed. Additionally, associated circuitry may provide power or grounding needed for the digital logic to operate. Several exemplary instances of associated circuitry include, for example: a bypass capacitor rail; Thevenin termination; pull-up voltage coupling; pull-down voltage coupling; a filter circuit, and the like.

A circuit design of logic circuit objects and associated circuitry may be stored in a number of representations including a logical schematic format displaying a simplified functional data abstraction or representation of the circuit objects. A physical representation or abstraction of the objects and associated circuitry may be stored including actual geometry and dimensionality. A number of other data abstractions or representations may also be stored for use in different tasks along the design flow. The schematic representations of the objects and associated circuitry may be used collectively to render a logical schematic view of the circuit design. Such circuit design is generally abbreviated in representation in that actual physical circuitry is not shown, the actual paths of routing are not shown, and the like. Instead, a simplified representation schematically illustrating which objects are interconnected and how they are logically laid out are preferably displayed.

A physical layout view, on the other hand, generally has absolute locations, such as an X, Y, and Z coordinate system for placement of objects within the circuit design. Additionally, the graphical representation of each object is generally geometrically accurate including true dimensionality thereof. Although the present invention has been described, for brevity, as being applied to schematic representations, it may be used with any suitable representation of interconnected objects with associated circuitry.

The schematic graphical representations of circuit objects and associated circuitry, amongst other representations, are preferably stored in the graphic database 101 within the storage disk 102. Associations are preferably maintained as tags/markers or bi-directional pointers within netlist data, however, they may be stored as a separate file(s). Any suitable measures known in the art for correlating parent and associated circuitry may be employed. Preferably, attribute fields/member variables are employed to indicate status, including for example: visibility, page location, highlighting, various association meta-data, type of circuit/object, unique identifiers, and the like. A user interface 100 is provided for a circuit editing tool which displays, in a graphical user interface, at least one page of a schematic representation of the circuit design. The user interface layer 100 may also include buttons, toolbars, sub-windows, and other user configurable controls.

User interface layer 100 retrieves the circuit schematic and the individual schematic representations of the circuit objects from the graphic database 101 for rendering on a display 103. User interface layer 100 accepts user input such as, for example, the pointing of a mouse and clicking thereof. Keyboard and digitizer input may be accepted as well as any other suitable input or interfacing measures. By both displaying the schematically arranged circuit objects and receiving user interface actions, the user interface layer 100 is able to interface with the user to selectively render and display desired portions of the circuit design for viewing and/or modification. A schematic for a circuit design may be quite large requiring multiple different pages for display of all of the objects and associated circuitry thereof in order for the details to be legible to a user. Therefore, the schematic may spread across a great number of pages depending upon the complexity of the circuit design.

Figure 1B:
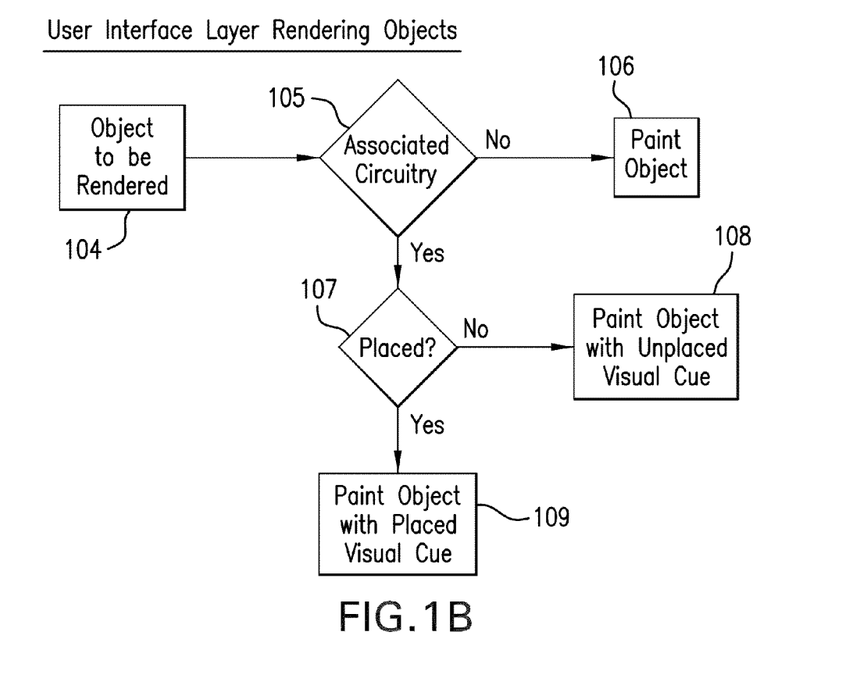
FIG. 1B is a flow diagram illustrating a flow of processes for visual cue management carried out according to an exemplary embodiment of the present invention.

Referring now to FIG. 1B, there is illustrated a flow of processes carried out in accordance with an exemplary embodiment of the present invention whereby the user interface layer renders various objects on a schematic page. Circuit objects in the graphic database 101 are visually rendered for output on display 103. At block 104, an object to be rendered is retrieved from the graphic database 101 and evaluated at block 105 to determine whether the object constitutes associated circuitry or a core logic object of the circuit design. If the determination is that the object is core logic, then the object is rendered at block 106 to be a core logic object. If on the other hand, the determination is of associated circuitry at block 105, then the flow proceeds to block 107 where it is determined whether the associated circuitry has already been placed or affixed within the schematic circuit design. If the circuit object is determined at block 107 to have not been placed, then the object is rendered at block 108 with an "unplaced" visual cue.

Such determination on the placement of the associated circuitry may be determined by evaluating flags, properties, attributes, member variables, and the like related to the object under evaluation. Each circuit object is preferably defined by a data structure within the database 101, having one or more member variables or fields for the maintenance of information indicating attributes of the circuit object. For example, the circuit object data structure may have a placed attribute, visible attribute, a page location attribute, X, Y, and Z coordinates within the schematic, rotational status, and the like. Any suitable number of attributes for each circuit object may be separately maintained in the graphic database 101 as data fields or variables. The evaluations processed at block 105 to determine associations between circuitry objects and the evaluations processed at block 107 to determine placement are preferably performed by automatically querying such fields within the data structures in the database 101 for each corresponding circuit object. The fields may, for example, employ indicative values like '0' to indicate 'no'—and '1' indicate 'yes' for such attributes as placement, association, and the like. Boolean logic may be employed to evaluate a number of fields or to determine relationships between fields.

If the determination at block 107 is that the associated circuitry has been placed within the schematic, then the flow proceeds to block 109 where the at least one of the parent object or the associated circuitry object is painted or rendered in the graphical user interface of the circuit editing tool with a "placed" visual cue. Such evaluation may be performed for each circuit object to be placed in the circuit schematic. In such manner, a number of visual cues may be superimposed on top of (or placed near) corresponding objects in the schematic diagram of the circuit design. The Graphics database (DB) preferably keeps track of the relationship between the associated circuitry and its associated parent. Each circuit object may then be quickly and efficiently viewed by the user to have an association or to have a defined location within the schematic diagram. In such manner, corresponding visual cues between two objects or a placed parent logic core object and at least one associated circuitry object may be maintained. A visual cue may be displayed on the core logic to indicate the presence of associated circuitry, its location, to what extent the associated circuitry has been placed in the circuit design, and the like. Correspondingly, a visual cue may be placed on or near each of the associated circuit objects themselves, indicating association with a parent core logic object in the circuit design. User operable controls such as graphically rendered virtual buttons, or the like, may also be displayed as needed near or as part of the visual indicia to enable the user to manipulate associated circuitry or the parent circuit object.

Figure 2A:
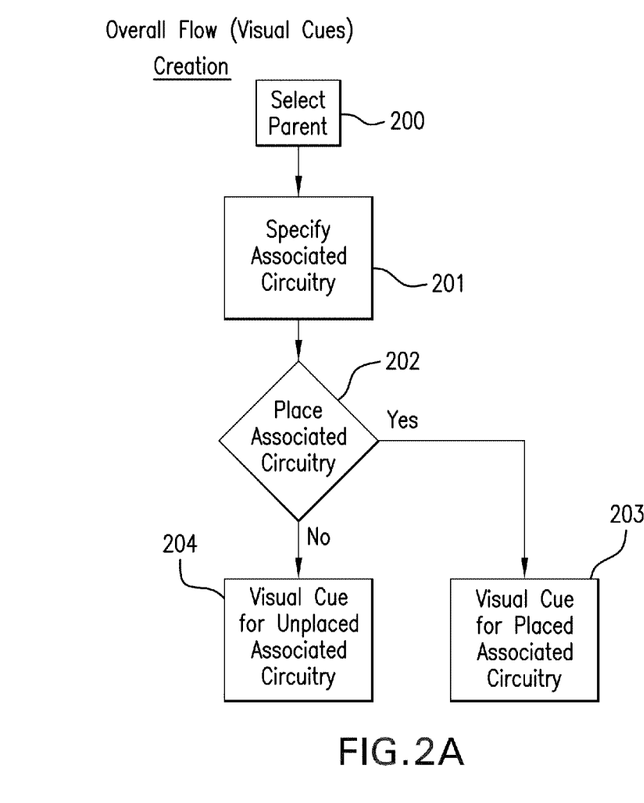
FIG. 2A is a flow diagram illustrating a flow of processes in a visual cue creation carried out according to an exemplary embodiment of the present invention.

Referring now to FIG. 2A, there is shown a flow diagram illustrating a general flow of processes for creating a visual cue of associated circuitry in accordance with certain exemplary embodiments of the present invention. The disclosed process provides for the creation of visual cues in a circuit display. A parent core logic object displayed in a circuit schematic, in a net list, or any other representation of circuit objects is selected at block 200 such as by the actuation of a user interface device. At block 201, circuitry associated with the selected parent circuit object is specified. The association may be entered for example by textual entry of an association into, for example, netlist data, through a tabular listing. A user may specify a library filename or the like to call and incorporate certain pre-stored circuitry. Alternatively the association may be effected by actuating a mouse or other user interface device in a schematic GUI, potentially through buttons, menus, right click context menus, and the like. Any suitable user interface for effecting the association between core logic circuit objects and associated circuitry may be employed. Another exemplary measure for effecting association is by actuating a parent object, and actuating a command to place known associated circuitry, such as a bypass capacitor rail. By placing the bypass rail, the netlist is modified to include the association between the newly formed bypass rail and the parent object. Similarly, by creating circuit objects, such as by drawing or otherwise instantiating objects, perhaps in the schematic or a tabulated list of circuit objects, and manually associating them with a parent circuit object, a connectivity association is maintained. Thereby, preexisting circuit objects in the design or newly created circuit objects may be associated. Connectivity associations may be maintained in the circuit design, in the netlist, in extensible tags/markers, meta-data, extrinsic files, the schematic, or any other suitable location.

At block 202, the associated circuitry may be placed in the circuit design. This may actuated upon user selection of the of a particular location on the circuit schematic within a graphical user interface via a pointing device or entry of specific coordinate settings, relative positions, or page references. Once placement is made in response to user selection, the flow proceeds to block 203 where a visual cue is generated to indicate the associated circuitry placement status in the circuit design. On the other hand, at block 204, if the associated circuitry has not yet been placed, then a visual cue is generated to indicate that the associated circuitry is, as of yet, unplaced. Such visual cues are generally generated in superimposed relation to or within certain proximity of the parent core logic circuit object.

Figure 2B:
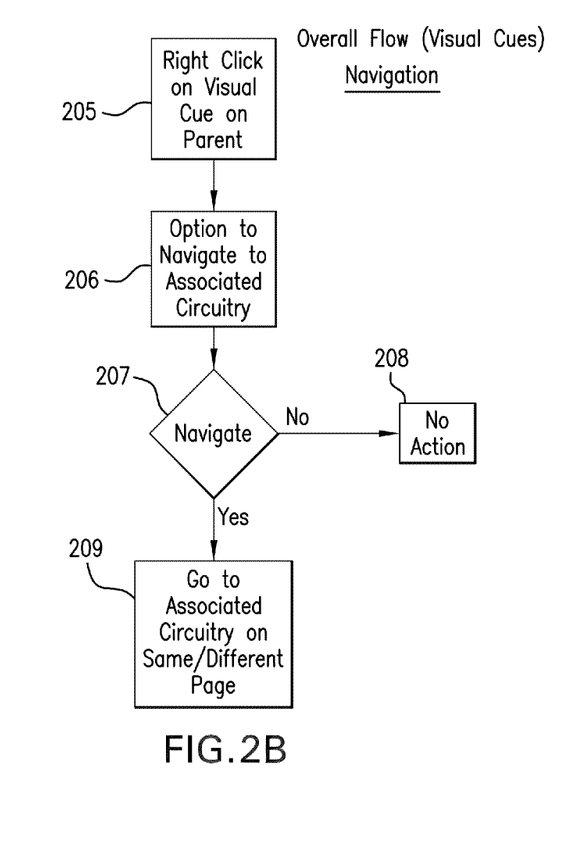
FIG. 2B is a flow diagram illustrating a flow of processes in a visual cue navigation carried out according to an exemplary embodiment of the present invention.

Referring now to FIG. 2B, there is shown a flow diagram illustrating a general flow of processes to productively exploit the association between parent circuit objects and their associated circuitry, in accordance with certain exemplary embodiments of the present invention. The disclosed flow provides for convenient, quick access to and manipulation of associated circuitry through actuation of a visual cue provided for a parent circuit object (preferably displayed on or about the parent object itself). The visual cue is preferably generated by querying attributes of the parent object stored in the netlist or schematic design. For example, on loading a page (such as at initial opening of the schematic, or on each page turn), attributes for each parent object are queried in the corresponding netlist to determine whether associated circuitry exists, whether it is placed, whether it is visible, highlighted, disposed on the same page, or the like. According to the queried attributes, visual cues are responsively generated and displayed.

A user actuates the visual cue on the parent core logic object at block 205. Such actuation may be through any suitable measures known in the art. For example, one may right click using a button of a mouse or other such pointing device to bring up a context menu. The user may then select the desired action or activity related to the parent object and associated circuitry. One such activity may be seen at block 206 where an option to navigate to associated circuitry may be effected. Responsive to user actuation of such activity, the circuit editor tool executes to preferably change the page from that containing the parent circuit object to a page containing its associated circuitry. Reciprocal navigation is preferably provided as well, where a user may actuate a visual cue or a user-operable manipulation/navigation control of the associated circuitry (or actuate the associated circuitry itself) to navigate back to the parent object.

Any suitable type of actions or activities related to the parent or the associated circuitry may be provided for the user. As another example, a "highlight associated circuitry" action for a visual cue of a parent circuit object may be provided for actuation by a user. Upon actuation, the location of the associated circuitry is determined, and suitable highlighting is applied to the associated circuitry. Similarly, other actions may be provided, whereby actuation by user selection may render the parent or associated circuitry visible or invisible, placed or unplaced, deleted, or the like. For example, a user may delete a parent object by actuation of the associated circuitry, may place an associated circuit object in the schematic by actuation of the parent, or any suitable derivative action may be performed.

At block 207, if navigation to the associated circuitry has been actuated, then flow proceeds to block 209 where a graphic user interface (GUI) of the circuit editor effects the necessary changes to provide a fuller view of the associated circuitry itself. Such navigation may be effected through an association link established in the netlist or extrinsically, such as by following an attribute of the associated parent object which sets a location within the schematic diagram, or by searching for a unique ID for the associated circuitry of the parent in the circuit design (such as a canonical reference, an address, or any other suitable measures for locating either the parent or the associated circuitry). Bi-directional navigation is effected similarly, providing the user with the ability to conveniently navigate in reciprocal manner between parent and associated circuitry; and also, from associated circuitry back to the parent circuit object. Reciprocal memory or netlist location pointers (such as seen in a doubly-linked list memory structure) are preferably employed; however, any suitable measures known in the art to record associations and reciprocal traversal may be employed.

If, on the other hand, at navigate evaluation block 207, no action is selected (such as indicated at 208), then no action is performed. In a similar manner, a user may right click or effect, through any suitable measures, manipulation of an associated circuit object (parent or associated circuitry) such as, for example, by right clicking on the visual cue of the associated circuitry and choosing an action, such as to navigate to the parent. As another example, a user may click on the visual cue of the parent object to effect an action on the associated circuitry thereof.

The visual cue on the parent object or the associated circuitry may have any suitable number of states and may convey one or more corresponding attributes. For example, the visual cue on associated circuitry may reference the name, location, or an identifier of the parent logic object. A user may double click, right click, or take any other suitable interaction measures to navigate or execute manipulative action from associated circuitry to parent or, vice versa, from parent to associated circuitry.

Compound actions or manipulations may be performed as well. Such as by actuating the visual cue of the parent or associated circuitry, one may launch a plurality of actions such as navigating to associated circuitry, making visible, highlighting, or the like. In such manner, the user may quickly navigate to, and be able to display and distinguish clearly associated circuitry or parent circuit objects.

As the schematic editor may have a number of functions and features, a click modifier such as holding a predetermined key for example CTRL, SHIFT, ALT, or the like, in addition to a clicking action or pointing action with a mouse, touch pad, or other human interface device, may be selectively set to invoke the set of actions performable on the parent or associated circuitry objects. For example, holding the N-key while clicking with a pointing cursor on a visual cue of a parent object may prompt automatic navigation to the associated circuitry. Whereas, holding the H-key while clicking with the pointing cursor on the visual cue of the parent object may automatically hide the associated circuitry, with the associated circuitry "hidden" attribute accordingly set to a '1' or 'yes' value.

Figure 3:
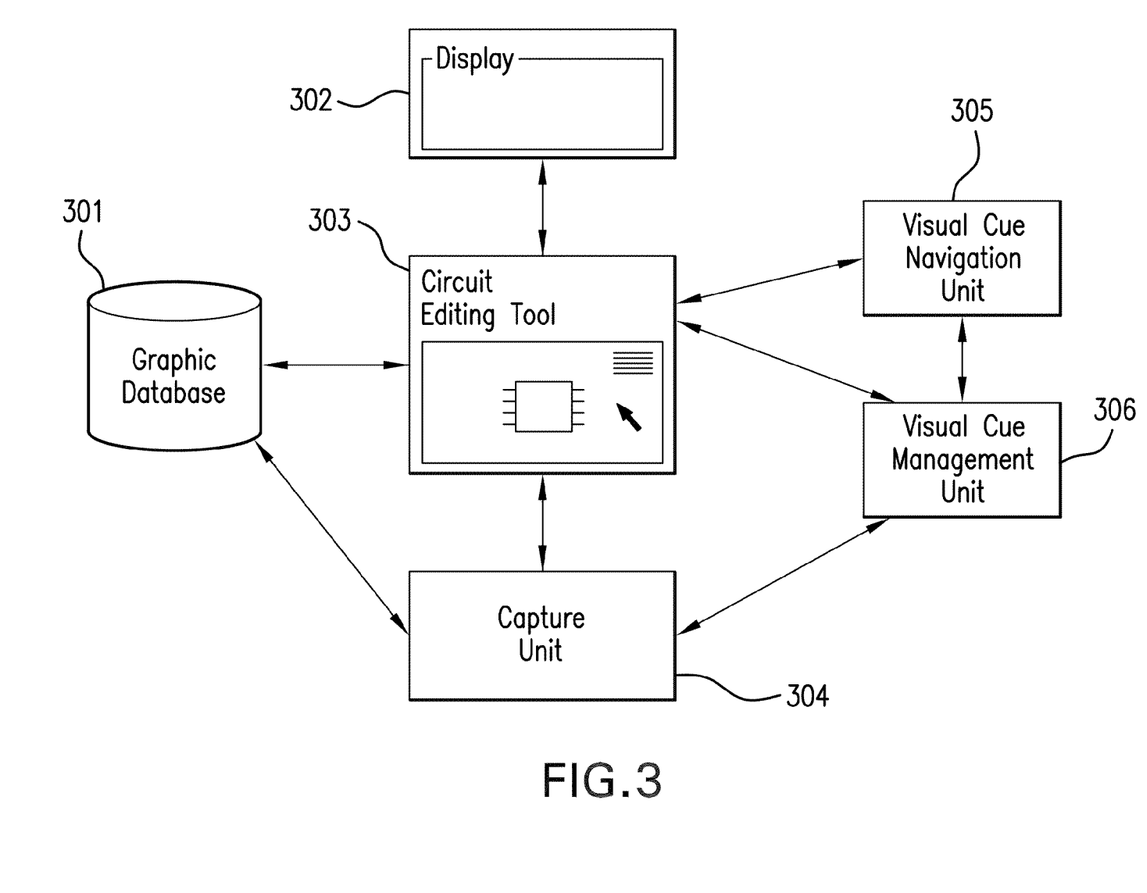
FIG. 3 is a block diagram illustrating an interconnection of components for implementing an exemplary embodiment of the present invention.

Referring now to FIG. 3, there is shown a block diagram illustrating an interconnection of units in a system implemented in accordance with an exemplary embodiment of the present invention. The system includes a schematic or circuit editing tool 303 having a graphical user interface for rendering and displaying circuit objects within a circuit schematic. The circuit editing tool 303 accesses the circuit objects and schematics from a graphic database 301. A tool may include any suitable user input measures known in the art such as a mouse, keyboard, touchpad, or the like by which users may manipulate objects on the display. During typical system operation, a user initially selects at least one parent object or associated circuitry object on the graphic user interface displayed on display 302. Responsive to this circuit object selection, the capture unit 304 coupled to the circuit editing tool 303 and graphic database 301, executes to capture the associated circuitry of the selected circuit object. Such capturing of associated circuitry may be effected by any suitable measures of the type illustratively described herein. For example, member attributes of a data structure/class defining the selected object may be evaluated. The selected circuit object in that case preferably has a member attribute of the defining data structure indicating association with another circuit object, which other circuit object may be certain associated circuitry. Additional attributes may include type-identification, unique identifier, readable names/designations (for the associated circuitry or parent object), and the like. Further, the placement, location, visibility, highlighted status, orientation, and other such attributes of the associated circuitry may be stored within member attribute data fields of the data structure defining the circuit object selected. Such member attributes may be stored in the selected parent object, the associated circuitry, or in a displaced location with pointers or other reference measures to either or both of the parent and associated circuitry.

The visual cue management unit 306 is coupled to the capture unit 304 and the circuit editing tool 303. The visual cue management unit is programmably configured to monitor a plurality of predetermined attributes for each associated circuitry captured related to the selected parent circuit object. According to the monitored attributes for each of the associated circuitry, its graphic indicia or other visual cue is adaptively generated based upon the attributes evaluated for the associated and/or parent objects. Such visual cues, in certain preferred embodiments, indicate the existence, location, identity, and the like of associated circuitry relative to the selected parent object. Such a visual cue is preferably placed on each parent and a corresponding visual cue is placed on the associated circuitry as well. The visual cue may employ any suitable measures such as color, pattern, contour, moving indicia, graphical indicia, or the like.

A visual cue navigation unit 305 is coupled to both the visual cue management unit 306 and the circuit editing tool 303. The visual cue navigation unit 305 allows for the user to perform certain acts or actions on the parent or associated circuitry. As discussed above, a user, through the parent object, may choose to navigate to the associated circuitry. Additionally, a user may choose to highlight, render visible, place, delete, or any other predefined activity upon the associated circuitry. In like manner, with certain selected associated circuitry, a user may perform another set of actions on the parent object, such as navigating directly to the parent object of the associated circuitry, rendering the parent object visible/invisible, highlighting the parent object, evaluating attributes of the parent circuit object, or other such actions.

In an illustrative implementation, the system and method disclosed herein may be implemented in any suitable computer based platform known in the art. For example, the system may comprise suitable storage media and one or more dedicated processors or share one or more processors executing/controlling other functions, wherein the employed processor(s) is programmably configured with processor instructions for performing the functions described herein. Suitable circuits may also be developed to execute certain aspects of these functions.

Figure 4:
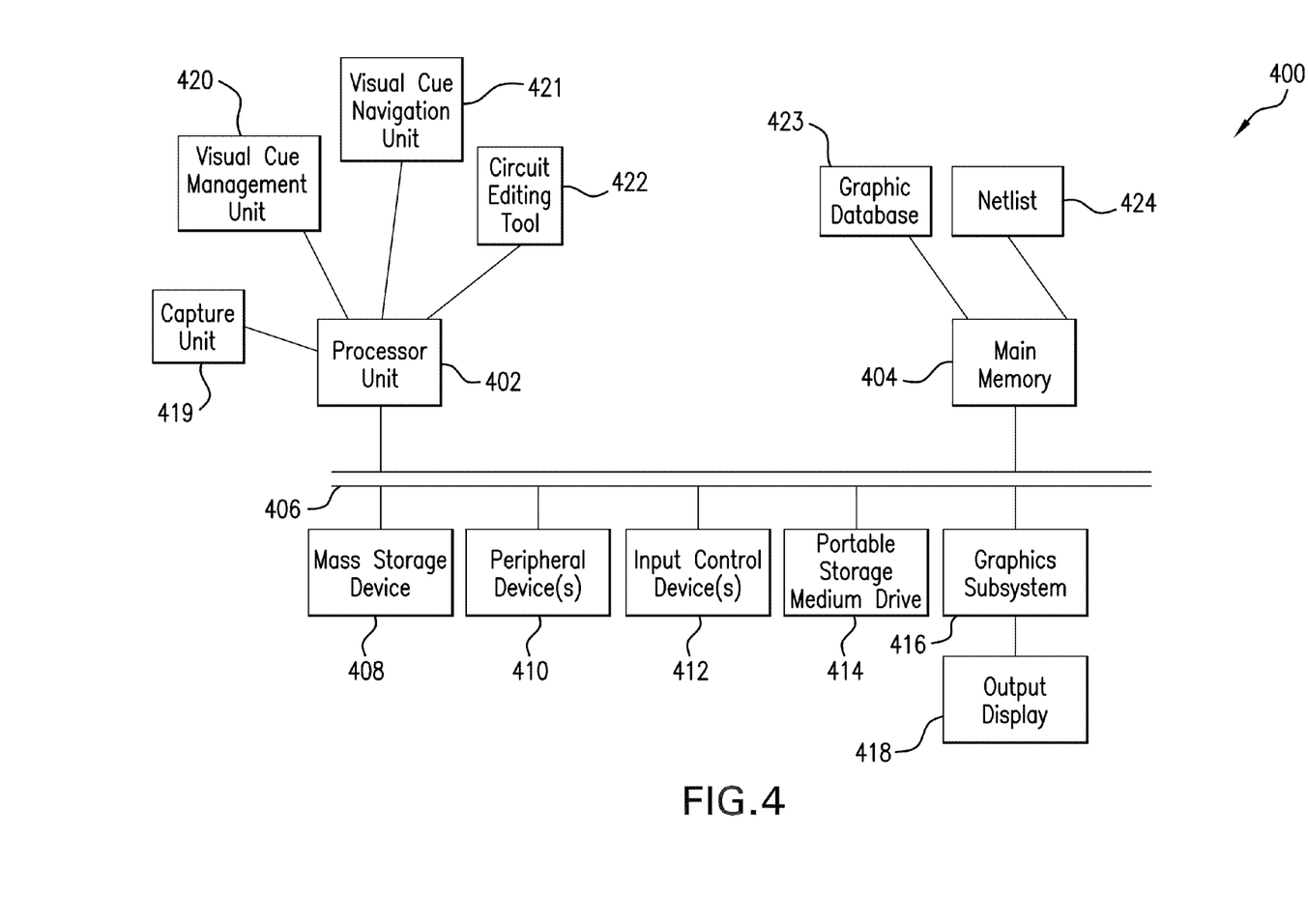
FIG. 4 is a block diagram illustrating an interconnection of components in a processor-based system for implementing an exemplary embodiment of the present invention.

Turning to FIG. 4, a block diagram illustrating one example of a computer system for hosting and/or executing an exemplary configuration of the disclosed system and method is illustrated. The computer system 400 includes a processor unit 402, a main or primary memory 404, an interconnect bus 406, a mass storage device 408, peripheral device(s) 410, input control device(s) 412, portable storage drive(s) 414, a graphics subsystem 416, and an output display 418, amongst other components. Depending on the intended application, portions of system 400 may be incorporated into one or more system on chip (SOCs). Processor unit 402 may include a single microprocessor or a plurality of microprocessors for configuring computer system 400 as a multi-processor system. Additionally, each physical processor unit 402 may include a plurality of cores. Main memory 404 stores, in part, instructions and data to be executed by processor 402 along with circuit design data, operational timing data, topology data, and structural data, amongst other relevant data. Main memory 404 preferably includes banks of dynamic random access memory (DRAM) as well as high-speed cache memory, such as static random access memory (SRAM) at various levels of the system architecture.

In the interests of simplicity and brevity, the components of computer system 400 are shown connected via interconnect bus 406. However, computer system 400 may be connected through one or more suitable data transport links. Mass storage device 408, may be implemented in any suitable form known in the art, including a magnetic disk drive, an optical disk drive, a solid state device such as a flash device, an attachment to network storage, cloud storage, a RAID arraying any of the above, and the like. The mass storage device 408 preferably includes a non-volatile storage medium for storing data, databases, and instructions, to be used by processor unit 402. In certain configurations, mass storage device 408 may store portions of the software to load it into main memory 404 or into firmware or ROM. Mass storage device 408 is preferably employed to store and provide access to circuit design data, including netlist data 424, a connectivity database, extrinsic data, separate files maintaining associations, meta data, and a graphic database 423, among other data sources. Such databases, data stores, tables, circuit design data, and the like are preferably retrieved from mass storage device 408 and at least portions thereof are stored in main memory 404 to provide faster reading and writing access thereto. Periodic synchronizing measures are taken between the volatile main memory 404 and non-volatile mass storage devices 408 to ensure accurate data archival. Preferably, pages of schematic design are selectively loaded responsive to use history, current usage, and anticipated usage for parent objects and their associated circuitry.

Portable storage medium drive 414 operates in conjunction with a portable non-volatile storage medium such as a floppy disk, a compact disk read only memory (CD-ROM), a digital versatile/video disk read only memory (DVD-ROM), or the like, to input and output data and code to and from the computer system 400. In one exemplary configuration, software portions, circuit design data, and the like are stored on such a portable medium, and are input to computer system 400 via portable storage medium drive 414.

Peripheral device(s) 410 may include any suitable type of computer support/extension device such as an input/output (I/O) interface, such as, for example PCI express or gigabit Ethernet, though any suitable IO, backplane, or other suitable interface may be employed to add additional functionality to computer system 400. For example, peripheral device(s) 410 may include additional network interface cards to interface computer system 400 to additional networks, servers, clusters, farms, or facilities, such as a separate semiconductor fabrication plant. Peripheral devices 410 or processor unit 402 may include further specialized processors such as clustered video cards utilizing graphics processor unit (GPU) floating point processing logic to supplement or supplant CPU processing. Dynamically configurable logic such as, for example, field programmable gate arrays (FPGAs) may also be coupled to system 400 through peripheral device(s) block 410 or processor unit block 402. Still further, specialized application specific integrated circuits (ASICS) may be coupled thereto to implement specialized logic to accelerate or implement certain portions of the invention such as a capture unit, visual cue management unit, and the like. Such units may be given direct memory access (DMA) and may have their own memory integrated therein. Additionally, a rapid circuit prototype fabrication unit may be coupled to the system via a backplane, system IO port, network connection, or the like. Such fabrication unit may include, for example, a lithographic or 3d additive printer, operable to physically fabricate a circuit design defined by circuit data. An IC product prototyping machine/(s) produces a prototype physical IC product embodying at least one circuit design such as by combinations of optical lithography, etching, carbon vapor deposition (CVD), additive 3d printing, or the like, though any suitable measures for fabricating an IC product embodying the transformed circuit design may be employed.

Capture unit 419, visual cue management unit 420, visual cue navigation unit 421, and circuit editing tool 422 are coupled to the processor unit 402. Such units may be implemented external to the processing unit 402 or may be partially or fully integrated therein, formed for instance as co-processors, cores, or the like. Any suitable processing arrangement known in the art may be employed in this regard. A graphic database 423 and net list 424 are preferably stored within main memory 404. Additionally, the graphic database 423 and net list 424 may be stored within mass storage device 408.

Input control device(s) 412 provide a portion of the user interface for a computer system 400 user. Input control device(s) 412 may include for example an alphanumeric keypad for inputting alphanumeric and other key information; a cursor control device such as a mouse, a track pad or stylus; or cursor direction keys.

In order to display textual and graphical information, computer system 400 contains a graphic subsystem 416 and output display(s) 418. Output display 418 may include a cathode ray tube (CRT) display, liquid crystal display (LCD), active matrix organic light emitting diode (AMOLED), plasma display, projector, or the like. Graphic subsystem 416 receives textual and graphical information and processes the information for output to display 418. Additionally, a printer, plotter, drafter, or any other suitable tangible output generator may be employed. For example, a user may print out a paper copy of the schematic or any portion thereof including the visual cues for parent circuit object and associated circuitry.

In a software implementation, portions of the software for certain measures may include a plurality of computer executable instructions, to be implemented on a computer system such as system 400. Prior to loading in the computer system 400, the software may reside as encoded information on a non-transitory computer-readable tangible medium such as a magnetic floppy disk, a magnetic tape, CD-ROM, DVD-ROM, flash memory, network attached storage (NAS), or any other suitable computer readable medium. Such software may control multiplexers, selectors, field programmable gate arrays (FPGAs), programmable logic arrays (PLAs), ASICS, or the like to implement logical control of certain features herein, such as, for example, associated circuitry capture, schematic rendering, visual cue management features, and the like.

Figure 5:
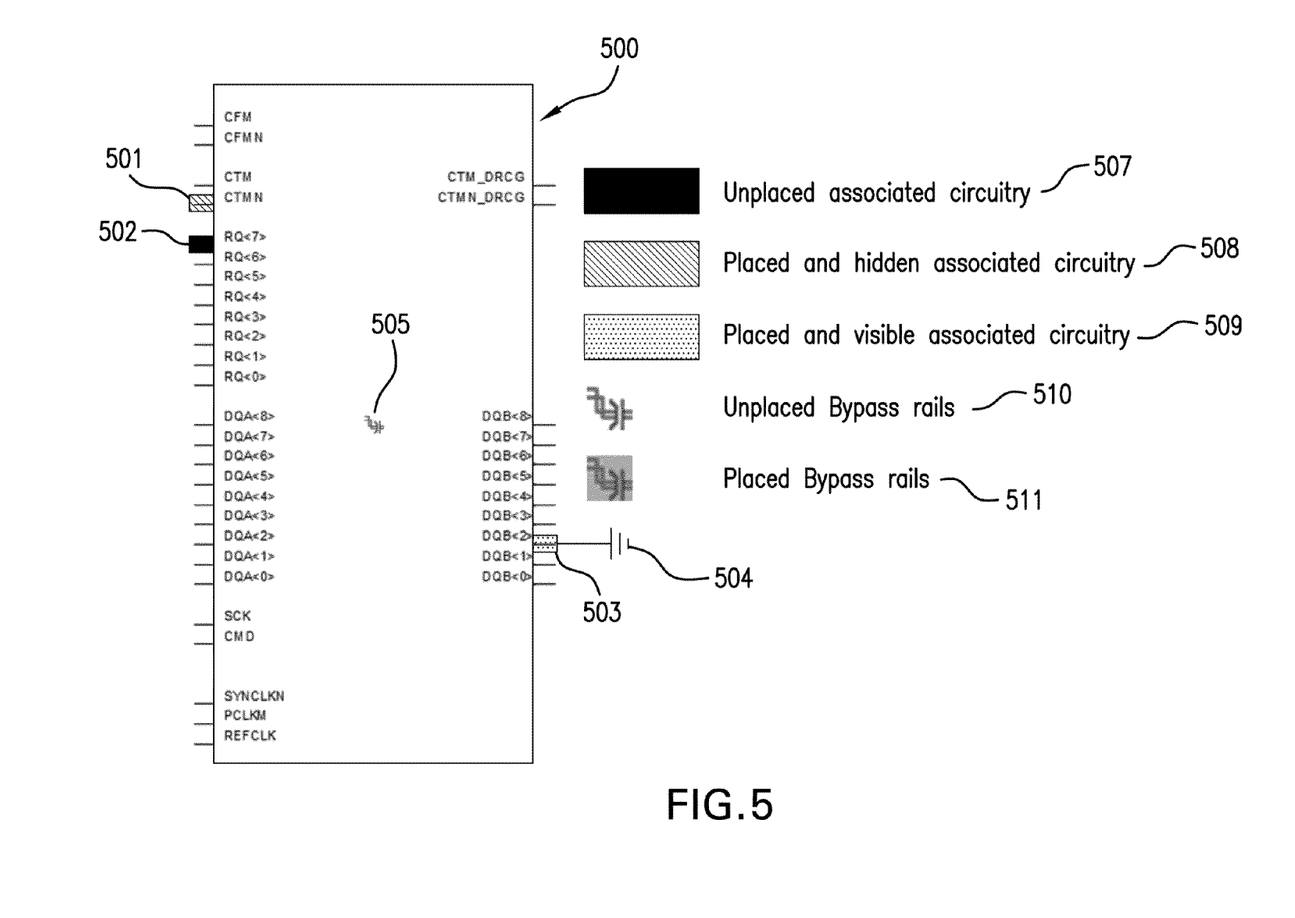
FIG. 5 is an illustrative representation of a portion of a graphic user interface generated during computer execution incorporating a number of visual cues in accordance with an exemplary embodiment of the present invention; and, FIG. 6 is another illustrative representation of a portion of a graphic user interface generated during computer execution incorporating both a parent circuit object and an associated circuitry with a number of visual cues in accordance with an exemplary embodiment of the present invention.

Referring now to FIG. 5, certain illustrative examples are shown of the visual cues as applied and presented for the user during illustrative operation of the disclosed system embodiment. As illustrated, a sample parent circuit object 500 is schematically represented in a portion of a graphic user interface (GUI) display for the user. Circuit objects in a schematic are represented symbolically, and their functional interconnections are represented in simplified schematic form. A user may select and manipulate a graphic display of the schematic to interactively reconfigure, navigate through, and modify a circuit design, amongst other functions.

The circuit object 500 may refer to a digital logic component such as a chip, a gate, a transistor, a pin/terminal/port/pad, a net connecting such components, or the like. In this instance, the circuit object 500 is an integrated circuit chip with a plurality of inputs and outputs. Associated circuitry such as a bypass capacitor rail may be indicated by a visual cue such as graphical indicia 505 superimposed on (or arranged in proximity to) the related circuit object 500. The visual cue 505 may have a plurality of different graphical states representing, as illustrated, for example: an unplaced bypass rail 510 or a placed bypass rail 511. If a bypass rail has been established in the circuit design and is coupled to the circuit object 500, then it may be said to be "placed." Any number of states or graphical indicia indicating the status of attributes of the associated circuitry or parent may be displayed, depending on the particular requirements of the intended application.

In this example, a pin 501 of the circuit object 500 also constitutes a circuit object of interest, and relates to certain associated circuitry of its own. Corresponding graphical indicia is superimposed over pin 501 indicating that the associated circuitry is placed and hidden according to the legend/key block 508. Thus, a design engineer may be able to discern with a quick view that there is indeed associated circuitry associated with the pin 501 and that the associated circuitry is currently in a hidden state and not visible. The associated circuitry may be located on the same page, or on a different page of the circuit schematic but is nonetheless invisible and hidden at the moment.

The visual indicia is preferably dynamically updated responsive to changes to a connectivity database, such as the netlist data in the graphic database. Visual cues are preferably cached for each object and associated circuitry, and updated/refreshed periodically. Updates to the visual cues may be responsive to arrival of a predetermined time period, to detected changes in connectivity, responsive to certain user actions, such as, for example, the placing of associated circuitry, and the like. The visual cues may be updated responsive directly to a user actuation or manipulation of the associated circuitry, such as by a menu item selection or the like, to render the associated circuitry visible. The visual cue at 501 dynamically changes responsive to the monitored attribute of the associated circuitry. Additionally, the visual cue at pin 501 provides for a user to effect certain actions upon the associated circuitry. For example, a user may double click, right click, or effect a modifier key plus click on the indicia at pin 501 to invoke one or more of several predefined actions such as navigating to, rendering visible, placing, deleting, highlighting, or the like. As discussed above, any suitable number of actions may be provided or performed upon the associated circuitry or the parent 501.

Another circuit object, pin 502 in this example, is visually marked with indicia denoting unplaced associated circuitry, as defined by a corresponding legend\key block 507. The user is visually cued thereby that the associated circuitry, as of yet, has not been placed or established in the circuit schematic. The presence of associated circuitry may be determined by evaluating the attributes of the circuit object 500 or circuit object 502 which preferably has an attribute such as associated circuitry=yes/no. In the event that the attribute associated circuitry has a zero or negative value, the visual cue is dynamically updated to display such status of the associated circuitry and parent object.

The circuit object pin 503 in this example does have associated circuitry, which has been placed, as indicated by its visual cue defined according to block 509. The visual cue is shown superimposed over pin 503. The associated circuitry 504 of this pin 503 happens to be a ground connection in the example, as indicated by the corresponding symbol and interconnection that is fully shown with the pin. Preferably, a user may actuate the visual cue over pin 503 to manipulate this associated circuitry 504. Manipulations may include for example actions like: deleting, rendering invisible, highlighting, hiding, or the like. Similarly, a user may actuate the associated circuitry 504 or a visual cue thereof to navigate back to the parent circuit object 503, to render the parent circuit object 503 invisible, or the like.

Figure 6:
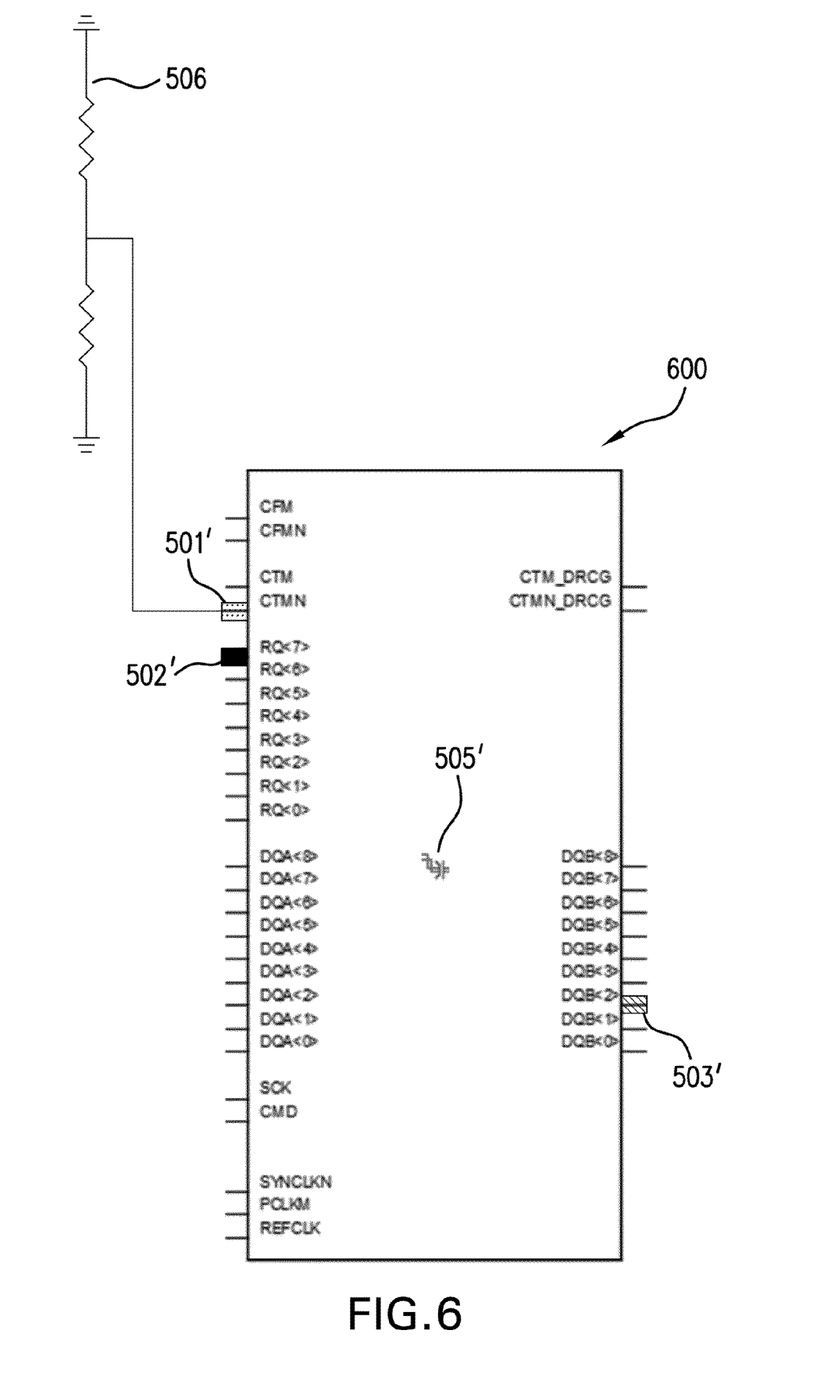

Turning now to FIG. 6, a sample parent circuit object 600 is schematically represented in a portion of a graphic user interface (GUI) display for the user during further illustrative operation of the disclosed system embodiment. Much as with the circuit object 500 in the preceding example, visual cue 505' provides an indication in this example that certain associated circuitry of the bypass capacitor rail type has been related to but not yet placed for parent object 600. In contrast, the visual cue superimposed over pin 503' indicates that the associated circuitry 504 is indeed placed but hidden in the current view. The visual cue over pin 502' remains the same as in FIG. 5, indicating that its associated circuitry has not been placed. Such case may arise, for example, if the association (between this parent circuit object and associated circuitry) is performed in another tool as may occur in parallel design flows. Another tool, such as, for example, a tabular presentation of the schematic, direct netlist editing (manually establishing an association), or any other suitable measures for effecting association may be performed concurrent with execution of the schematic circuit editor tool. An example of associated circuitry that is both placed and visible is shown for parent object pin 501', in the form of a termination circuit type associated circuitry 506. As this associated circuitry 506 is visible, the visual cue visually superimposed over pin 501' has been dynamically updated to indicate that the associated circuitry is now visible and not hidden.

Preferably, during use of the disclosed embodiment, a user may select graphic indicia of a parent circuit object and choose to hide the associated circuitry so as to focus on the parent circuit objects. To place associated circuitry for a parent circuit object, a user may click on the visual indicia and choose to 'place' associated circuitry. Preferably, a selection interface graphically presents for the user several predefined associated circuitry options to choose from, such as for example: a Thevenin or other type termination, bypass rails, and the like. Upon user selection, the selected associated circuitry is attached to an input cursor for placement on the schematic of the given circuit design. An interconnective path or connection line is preferably provided and displayed to follow the placement of the associated circuitry. Clicking on a portion of the schematic thereafter may instantiate the associated circuitry at the position specified by the user. Accordingly, the visual cue of the parent circuit object is adaptively updated to reflect the new status of the associated circuitry. Additionally, a visual cue for the associated circuitry is generated and displayed with the associated circuitry allowing for navigation back to the parent object, and for highlighting, visibility selection, or the like. The visual cue on the associated circuitry preferably indicates the parent circuit object name or unique identifier. When navigation back to the parent object is selectively activated, the page of the schematic that the parent is disposed on is loaded if it is not already present in memory.

The circuit schematic may be printed in hardcopy from the user interface. When printing, preferably, the visual cues are reproduced in the printout of the circuit schematic. Alternatively, the user may select an option to hide the visual cues as desired.

Although this invention has been described in connection with specific forms and embodiments thereof, it will be appreciated that various modifications other than those discussed above may be resorted to without departing from the spirit or scope of the invention as defined in the appended claims. For example, functionally equivalent elements or processes may be substituted for those specifically shown and described, certain features may be used independently of other features, and in certain cases, particular locations of the elements or processes may be reversed or interposed, all without departing from the spirit or scope of the invention as defined in the appended claims.

What is claimed is:

1. A system for adaptively maintaining a visual cue for associated circuitry relating to a schematically represented circuit object of an electronic circuit design, comprising:
    a circuit editing tool accessing a graphic database to electronically render schematic representations of one or more circuit objects responsive to user input, said circuit editing tool having a graphic user interface and a display for graphically displaying the schematic representations on one or more graphic pages;
    a capture unit coupled to said circuit editing tool, said capture unit being selectively actuated to acquire associated circuitry corresponding to at least one selected circuit object;
    a visual cue management unit coupled to said capture unit and said circuit editing tool, said visual cue management unit being programmably configured to automatically:
        monitor a plurality of predetermined attributes for each associated circuitry acquired from the at least one selected circuit object; and,
        adaptively generate predetermined graphic indicia for each said predetermined attribute for concurrent display with the schematic representation of the at least one selected circuit object; and,
    a visual cue navigation unit coupled to visual cue management unit and said circuit editing tool, said visual cue navigation unit maintaining a user-selectable actuation button on said graphic user interface for at least one of said predetermined graphic indicia displayed.

2. The system as recited in claim 1, wherein said capture unit is selectively actuated to acquire associated circuitry in a plurality of defining forms including: a schematically rendered definition, and a textually-listed definition.

3. The system as recited in claim 2, wherein the associated circuitry acquired by said capture unit is defined by at least one of: circuitry newly-rendered by said circuit editing tool, and circuitry selected from a plurality of pre-stored circuitry types.

4. The system as recited in claim 3, wherein the pre-stored circuitry types of associated circuitry include: a bypass capacitor rail; a Thevenin termination; a pull-up voltage coupling; a pull-down voltage coupling; and, a filter circuit.

5. The system as recited in claim 1, wherein said predetermined attributes monitored by said visual cue management unit for each associated circuitry acquired include: a circuitry type; a placed/unplaced state; and, a hidden/visible state.

6. The system as recited in claim 1, wherein at least one of said predetermined graphic indicia adaptively generated by said visual cue management unit is visually applied to the schematic representation of the at least one selected circuit object displayed.

7. The system as recited in claim 6, wherein said predetermined graphic indicia include: a graphic symbol to denote said circuitry type, at least a first color to denote one of said placed/unplaced states relative to the other, and at least a second color to denote one of said hidden/visible states relative to the other.

8. The system as recited in claim 6, wherein said visual cue navigation unit actuates navigating of the display between said predetermined graphic indicia visually applied to the schematic representation of the at least one selected circuit object and a predetermined representation of the acquired associated circuitry.

9. The system as recited in claim 8, wherein said predetermined graphic indicia visually applied to the schematic representation of the at least one selected circuit object coincides with said user-selectable navigation button.

10. A system for maintaining a dynamic visual cue for associated circuitry connectable to a schematically represented circuit object of an electronic circuit design, comprising:
    a circuit editing tool accessing a graphic database to electronically render schematic representations of one or more circuit objects responsive to user input, said circuit editing tool having a graphic user interface and a display for graphically displaying the schematic representations on one or more graphic pages;
    a capture unit coupled to said circuit editing tool, said capture unit being selectively actuated to acquire associated circuitry corresponding to at least one selected circuit object, the associated circuitry enabling operational implementation of the circuit object in the electronic circuit design without alteration thereof in digital logic;
    a visual cue management unit coupled to said capture unit and said circuit editing tool, said visual cue management unit being programmably configured to automatically:

monitor a plurality of predetermined attributes for each associated circuitry acquired from the at least one selected circuit object;

adaptively generate predetermined graphic indicia for each said predetermined attribute for concurrent display with the schematic representation of the at least one selected circuit object; and, visually dispose at least one of said predetermined graphic indicia at least partially upon the schematic representation of the at least one selected circuit object displayed by said circuit editing tool; and, a visual cue navigation unit coupled to said visual cue management unit and said circuit editing tool, said visual cue navigation unit maintaining a user-selectable actuation button on said graphic user interface for at least one of said predetermined graphic indicia displayed.

11. The system as recited in claim 10, wherein:

said capture unit is selectively actuated to acquire associated circuitry in a plurality of defining forms including: a schematically rendered definition, and a textually-listed definition; and, the associated circuitry acquired by said capture unit is defined by at least one of: circuitry newly-rendered by said circuit editing tool, and circuitry selected from a plurality of pre-stored circuitry types.

12. The system as recited in claim 11, wherein the pre-stored circuitry types associated circuitry include: a bypass capacitor rail; a Thevenin termination; a pull-up voltage coupling; a pull-down voltage coupling; and, a filter circuit.

13. The system as recited in claim 10, wherein: said predetermined attributes monitored by said visual cue management unit for each associated circuitry acquired include: a circuitry type; a placed/unplaced state; and, a hidden/visible state; and, said predetermined graphic indicia include: a graphic symbol to denote said circuitry type, at least a first color to denote one of said placed/unplaced states relative to the other, and at least a second color to denote one of said hidden/visible states relative to the other.

14. The system as recited in claim 10, wherein:

said visual cue navigation unit actuates navigating of the display between said predetermined graphic indicia visually applied to the schematic representation of the at least one selected circuit object and a predetermined representation of the acquired associated circuitry; and, said predetermined graphic indicia visually applied to the schematic representation of the at least one selected circuit object coincides with said user-selectable navigation button.

15. A method for adaptively maintaining a visual cue for associated circuitry relating to a schematically represented circuit object of an electronic circuit design, comprising:

establishing a processor coupled to a memory storing a graphic database; executing said processor to access said graphic database and render schematic representations of one or more circuit objects responsive to user input, said circuit editing tool having a graphic user interface and a display;

actuating said display to graphically display the schematic representations on one or more graphic pages;

selectively identifying associated circuitry corresponding to at least one selected circuit object;

monitoring a plurality of predetermined attributes for each associated circuitry acquired corresponding to the at least one selected circuit object;

adaptively generating predetermined graphic indicia for each said predetermined attribute for concurrent display with the schematic representation of the at least one selected circuit object; and, maintaining a user-selectable actuation control on said graphic user interface for at least one of said predetermined graphic indicia displayed.

16. The method as recited in claim 15, wherein said predetermined attributes monitored for each identified associated circuitry include: a circuitry type; a placed/unplaced state; a highlighted/unhighlighted state; and, a hidden/visible state.

17. The method as recited in claim 15, wherein at least one of said predetermined graphic indicia is visually applied to the schematic representation of the at least one selected circuit object displayed.

18. The method as recited in claim 15, wherein said predetermined graphic indicia include: a graphic symbol to denote said circuitry type, at least a first color to denote one of said placed/unplaced states relative to the other, and at least a second color to denote one of said hidden/visible states relative to the other.

19. The method as recited in claim 15, wherein said graphic indicia actuates navigating of the display between said predetermined graphic indicia visually applied to the schematic representation of the at least one selected circuit object and the identified associated circuitry.

20. The method as recited in claim 15, wherein said graphic indicia is user selectable to execute a placement action for an associated circuitry of the at least one selected circuit object.

* * * * *